United States Patent
Kring (10) Patent No.: US 10,264,231 B2
(45) Date of Patent: Apr. 16, 2019

(54) DYNAMICALLY SCALING THE COLOR TEMPERATURE AND LUMINANCE OF A DISPLAY OUTPUT

(71) Applicant: The DIRECTV Group, Inc., El Segundo, CA (US)

(72) Inventor: Erich J. Kring, Torrance, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

(21) Appl. No.: 15/476,282

(22) Filed: Mar. 31, 2017

(65) Prior Publication Data

US 2018/0288382 A1 Oct. 4, 2018

(51) Int. Cl.
- H04N 9/77 (2006.01)
- H04N 5/57 (2006.01)
- H04N 9/73 (2006.01)
- H04N 1/60 (2006.01)
- H04N 5/44 (2011.01)

(52) U.S. Cl.
CPC ............ *H04N 9/77* (2013.01); *H04N 1/6008* (2013.01); *H04N 5/4403* (2013.01); *H04N 5/57* (2013.01); *H04N 9/73* (2013.01)

(58) Field of Classification Search
CPC ....... H04N 9/77; H04N 1/6008; H04N 5/4403
See application file for complete search history.

(56) References Cited

U.S. PATENT DOCUMENTS

| 6,034,665 A | 3/2000 | Kim | |
| 6,067,126 A * | 5/2000 | Alexander | G11B 27/034 348/722 |
| 6,188,439 B1 * | 2/2001 | Kim | H04N 5/60 348/478 |

(Continued)

FOREIGN PATENT DOCUMENTS

| WO | 2012057907 A1 | 5/2012 |
| WO | 2013088781 A1 | 6/2013 |

OTHER PUBLICATIONS

Jiadi Yu et al., "Sensing Ambient Light for User Experience-Oriented Color Scheme Adaptation on Smartphone Displays." Proceedings of the 13th ACM Conference on Embedded Networked Sensor Systems. ACM, Nov. 1, 2015. pp. 309-321. http://www.cs.sjtu.edu.cn/~jdyu/papers/2015_SenSys.pdf.

(Continued)

*Primary Examiner* — Brian P Yenke (57) ABSTRACT

In one example, the present disclosure describes a device, computer-readable medium, and method for dynamically scaling the color temperature and luminance of a display output according to a user preference. For instance, in one example, a video output signal comprising a plurality of image frames is delivered to a display device. A time is detected at which to adjust an amount of blue light emitted by the display device, in accordance with a user preference. The color temperature of a subset of the plurality of image frames that have yet to be delivered to the display device is adjusted from a default color temperature to an adjusted (Continued)

color temperature that scales the amount of blue light emitted by the display device. The subset of the plurality of image frames is then delivered to the display device, subsequent to the adjusting.

20 Claims, 4 Drawing Sheets

(56) References Cited

U.S. PATENT DOCUMENTS

| | | | | |
|---|---|---|---|---|
| 6,263,502 B1* | 7/2001 | Morrison | | H04N 5/44 348/563 |
| 6,481,011 B1* | 11/2002 | Lemmons | | H04N 5/44543 348/E5.105 |
| 6,714,253 B2* | 3/2004 | Kim | | H04N 5/4401 348/554 |
| 6,870,575 B2* | 3/2005 | Hibi | | H04N 3/34 348/380 |
| 7,024,034 B2 | 4/2006 | Kim et al. | | |
| 7,151,572 B2* | 12/2006 | Shirahama | | H04N 5/57 348/254 |
| 7,245,316 B2* | 7/2007 | Grimes | | H04N 3/20 348/173 |
| 8,026,953 B2 | 9/2011 | Lammers et al. | | |
| 8,294,827 B2 | 10/2012 | Kao | | |
| 8,390,642 B2 | 3/2013 | Frederick et al. | | |
| 8,479,249 B2* | 7/2013 | Koike | | H04N 21/234327 345/581 |
| 8,497,872 B2 | 7/2013 | Kao | | |
| 8,619,101 B2 | 12/2013 | Marcu et al. | | |
| 8,866,835 B2 | 10/2014 | Tanizoe et al. | | |
| 8,957,847 B1* | 2/2015 | Karakotsios | | G06F 3/013 345/156 |
| 9,247,286 B2* | 1/2016 | Karaoguz | | H04N 13/0029 |
| 9,474,119 B1* | 10/2016 | Chen | | H05B 33/0872 |
| 9,478,157 B2 | 10/2016 | Wu et al. | | |
| 9,565,410 B2 | 2/2017 | Huai | | |
| 2003/0103165 A1* | 6/2003 | Bullinger | | H04N 5/44543 348/569 |
| 2005/0036069 A1* | 2/2005 | Lee | | H04N 5/60 348/632 |
| 2006/0087517 A1* | 4/2006 | Mojsilovic | | G06T 7/90 345/593 |
| 2006/0165280 A1* | 7/2006 | Miwa | | G06T 11/001 382/167 |
| 2008/0016532 A1* | 1/2008 | Wang | | H04N 5/4401 725/45 |
| 2008/0204598 A1* | 8/2008 | Maurer | | G11B 27/034 348/584 |
| 2009/0138805 A1* | 5/2009 | Hildreth | | G06K 9/00335 715/745 |
| 2009/0267879 A1 | 10/2009 | Masuda | | |
| 2010/0176752 A1* | 7/2010 | Xiong | | H05B 37/02 315/363 |
| 2010/0264850 A1* | 10/2010 | Yamamoto | | G09G 5/14 315/312 |
| 2013/0322752 A1* | 12/2013 | Lim | | G06T 5/20 382/167 |
| 2014/0063039 A1* | 3/2014 | Drzaic | | G09G 5/02 345/589 |
| 2014/0139655 A1* | 5/2014 | Mimar | | G08B 21/0476 348/77 |
| 2016/0121073 A1* | 5/2016 | Mok | | G09G 3/20 600/27 |
| 2016/0129218 A1* | 5/2016 | Mok | | A61M 21/02 345/694 |
| 2016/0133177 A1* | 5/2016 | Won | | G09G 3/2092 345/694 |
| 2016/0180801 A1* | 6/2016 | Lee | | H04M 1/72569 345/156 |
| 2016/0189671 A1* | 6/2016 | Kim | | G09G 3/3291 345/690 |
| 2016/0189674 A1* | 6/2016 | Nishigaki | | G09G 5/02 345/690 |
| 2016/0295646 A1* | 10/2016 | Lim | | H05B 33/086 |
| 2016/0330813 A1* | 11/2016 | Chen | | H05B 33/0872 |
| 2016/0353096 A1* | 12/2016 | Tomono | | H04N 5/4403 |
| 2016/0358538 A1* | 12/2016 | Schuch | | H05B 37/0218 |
| 2016/0366746 A1* | 12/2016 | van de Ven | | F21V 29/74 |
| 2017/0024858 A1* | 1/2017 | St. Clair | | G06T 5/002 |
| 2017/0069290 A1* | 3/2017 | Lee | | G09G 3/2044 |
| 2017/0103728 A1* | 4/2017 | Chen | | G09G 5/02 |
| 2017/0171950 A1* | 6/2017 | Barna | | H05B 37/0272 |
| 2017/0318345 A1* | 11/2017 | Branton-Housley | | H04N 21/478 |
| 2018/0004747 A1* | 1/2018 | Smith | | G06F 17/30047 |
| 2018/0021593 A1* | 1/2018 | Vartanian | | A61N 5/0618 |
| 2018/0040270 A1* | 2/2018 | Won | | G09G 3/2007 |
| 2018/0068636 A1* | 3/2018 | Kim | | G09G 5/04 |

OTHER PUBLICATIONS

Mian Dong et al., "Chameleon: a color-adaptive web browser for mobile OLED displays." IEEE Transactions on Mobile Computing, vol. 11, Issue 5, (Feb. 7, 2012): pp. 724-738.

* cited by examiner

DYNAMICALLY SCALING THE COLOR TEMPERATURE AND LUMINANCE OF A DISPLAY OUTPUT

The present disclosure relates generally to home automation, and relates more particularly to devices, non-transitory computer-readable media, and methods for dynamically scaling the color temperature and luminance of a display output according to a user preference.

BACKGROUND

Most display devices including televisions, computer monitors, tablet computers, and smartphones include mechanisms for adjusting the display settings. For instance, settings such as color temperature, luminance, contrast, and tint may all be adjustable within some defined range. Often, these settings are factory-calibrated to default values by the manufacturer, but can be adjusted by the end user. Thus, the end user can adjust the settings to achieve a desired picture quality.

SUMMARY

In one example, the present disclosure describes a device, computer-readable medium, and method for dynamically scaling the color temperature and luminance of a display output according to a user preference. For instance, in one example, a video output signal comprising a plurality of image frames is delivered to a display device. A time is detected at which to adjust an amount of blue light emitted by the display device, in accordance with a user preference. The color temperature of a subset of the plurality of image frames that have yet to be delivered to the display device is adjusted from a default color temperature to an adjusted color temperature that scales the amount of blue light emitted by the display device. The subset of the plurality of image frames is then delivered to the display device, subsequent to the adjusting.

In another example, a device includes a processor and a computer-readable medium storing instructions which, when executed by the processor, cause the processor to perform operations. The operations include delivering a video output signal comprising a plurality of image frames to a display device, detecting a time at which to adjust an amount of blue light emitted by the display device, in accordance with a user preference, adjusting the color temperature of a subset of the plurality of image frames that have yet to be delivered to the display device from a default color temperature to an adjusted color temperature that scales the amount of blue light emitted by the display device, and delivering the subset of the plurality of image frames to the display device, subsequent to the adjusting.

In a further example, an apparatus includes a processor for detecting a time at which to adjust an amount of blue light emitted by a display device, in accordance with a user preference, and for adjusting the color temperature of a video output signal from a default color temperature to an adjusted color temperature that scales the amount of blue light emitted by the display device, and an output device for delivering the video output signal to the display device, subsequent to the adjusting.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure dynamically scales the color temperature and luminance of a display output according to a user preference. As discussed above, most display devices including televisions, computer monitors, tablet computers, and smartphones include mechanisms for adjusting the display settings. Thus, an end user can adjust the settings to achieve a desired picture quality. However, the values of these settings may affect more than simply the user's enjoyment of a particular media; they may also have physiological effects on the user. For instance, exposure to blue light has been associated with a decrease in melatonin levels, which may contribute to circadian sleep disorders, depression, cardiovascular disease, and other physiological conditions. However, blue light exposure may also be used to intentionally suppress melatonin levels for the purposes of improving concentration and wakefulness and treating seasonal affective disorder.

Examples of the present disclosure provide a means for dynamically adjusting the color temperature and luminance of a display output to either increase or decrease the user's exposure to blue light, based on the user's preferences. In one example, the color temperature and luminance are adjusted in the video signal that is sent to the display device. For instance, a server or set-top box may shift the reference white point of the image frames in an incoming video signal before outputting the video signal to the display device. Within the context of the present disclosure, the "reference white point" is understood to be a relative term that refers to the set of chromaticity coordinates that defines the color "white" in a particular image frame. For instance, a photograph taken indoors under incandescent light will possess a reference white point that is substantially more orange than that of a photograph taken outdoors in broad daylight.

When the reference white point is shifted, the corresponding total average luminance levels of red, green, and blue emitted by the display will be changed. A shift of the reference white point toward warmer (e.g., longer, redder) wavelengths may promote a feeling of restfulness in the user, as may be desired before going to sleep for the night. A shift of the reference white point toward cooler (e.g., shorter, bluer) wavelengths may promote a feeling of alertness in the user, as may be desired when the user is working late, studying, or coping with seasonal affective disorder (or other conditions linked to high levels of melatonin). In one example, color temperatures over 5,000 Kelvin are referred to herein as "cool" (e.g., bluish-white) colors, while color temperatures below 5,000 Kelvin (and in particular within the range of 2,700 to 3,000 Kelvin) are referred to herein as "warm" (e.g., yellowish-white through red) colors. Some commonly observed color temperatures include a candle flame (approximately 1,850 Kelvin), incandescent light (approximately 2,700-3,000 Kelvin), moonlight (approximately 4,100-4,150 Kelvin), horizon daylight (approximately 5,000 Kelvin), overcast daylight (6,500 Kelvin), and sunlight from a clear blue pole-ward sky (approximately 15,000-27,000 Kelvin).

Further examples of the present disclosure reduce or increase the overall intensity of blue light emitted by a display output while preserving shadow detail, sky colors, and other image components that may include higher levels of blue light. This example may be especially useful, for instance, when the user is watching a movie but wishes to either increase or decrease the overall exposure to blue light.

Figure 1:
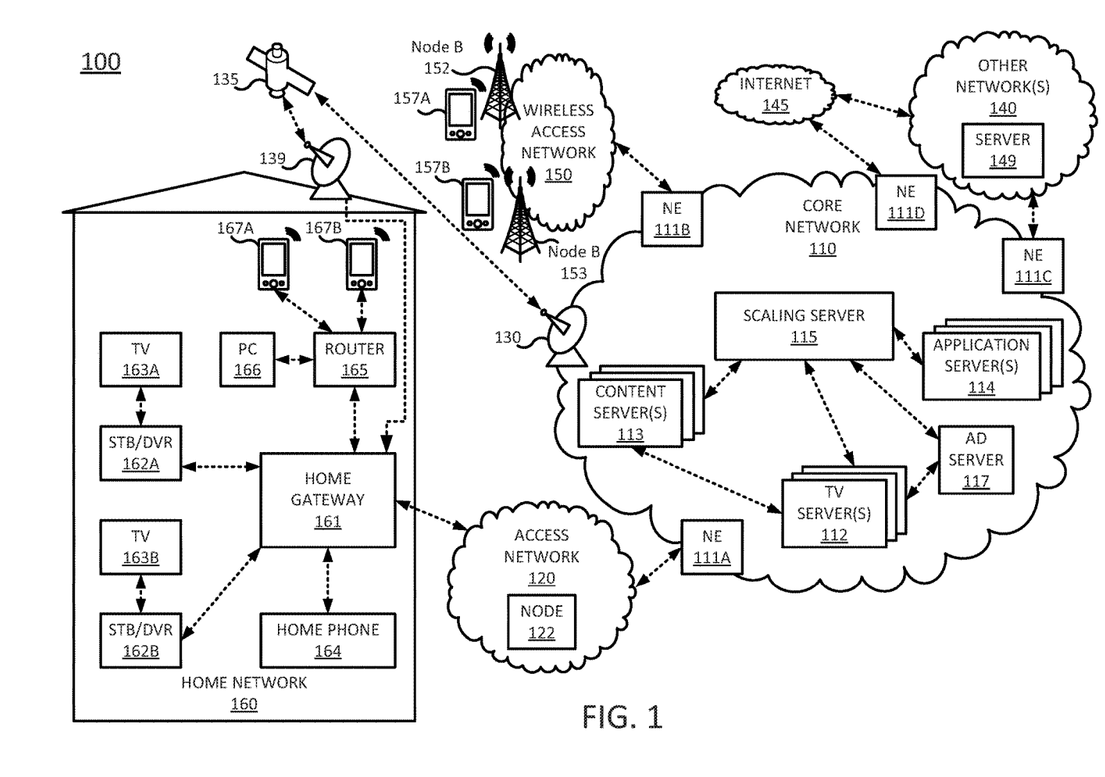
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and a scaling server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and scaling server 115 to select which video programs, or other content and advertisements to provide to the home network 160 and to others.

In one example, content servers 113 may store scheduled television broadcast content for a number of television channels, video-on-demand programming, local programming content, and so forth. For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, scaling server 115 may generate and/or store metadata files associated with media stored by content servers 113 and/or advertising server 117. The metadata files contain data or instructions for transforming media so that the color temperature and luminance of the media can be scaled according to a user preference (which may also be stored by the scaling server), as discussed in greater detail below.

Figure 4:
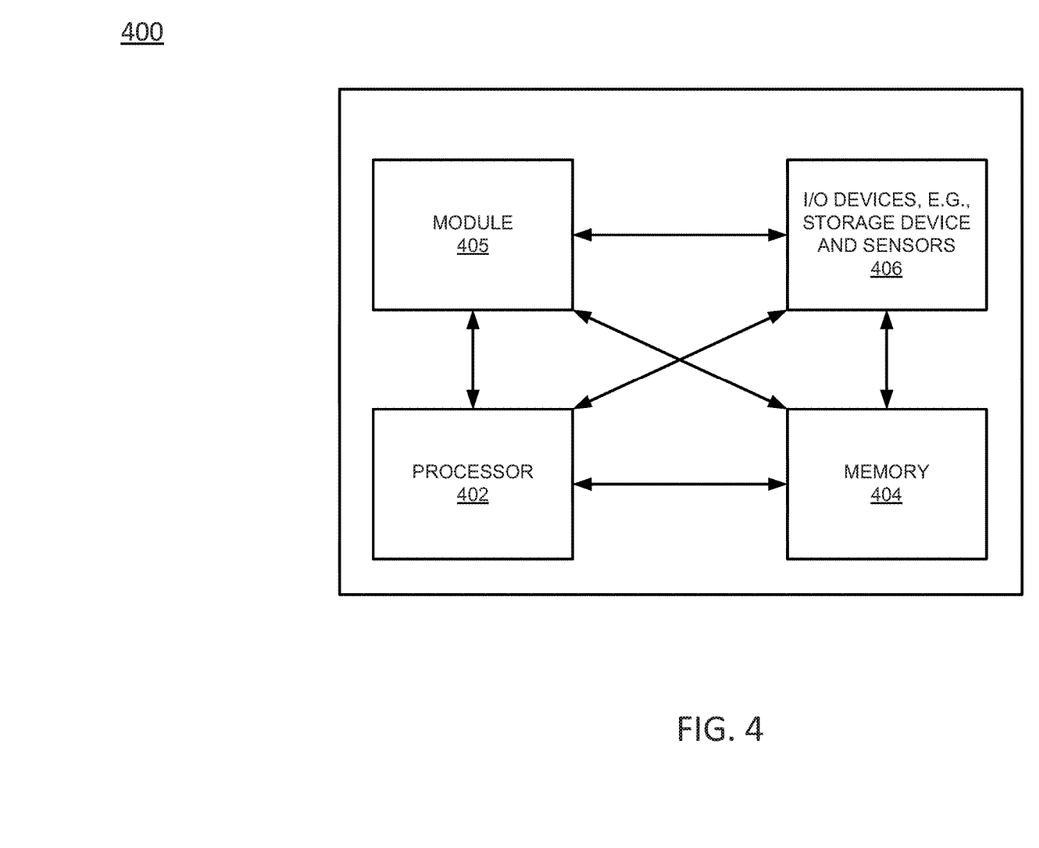
FIG. 4 depicts a high-level block diagram of a computing device specifically programmed to perform the functions described herein.

In one example, any or all of the television servers 112, content servers 113, application servers 114, scaling server 115, and advertising server 117 may comprise a computing system, such as computing system 400 depicted in FIG. 4

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 and/or metadata files from scaling server 115 for uplink transmission to satellite 135. Accordingly, satellite 135 may receive television content and/or metadata files from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data files are forwarded to set-top boxes (STBs)/digital video recorders (DVRs) 162A and 162B to be decoded, recorded, and/or forwarded to television (TV) 163A and TV 163B for presentation or to connected home devices (CHDs) 170A and 170B for further action. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

In one example, one or both of the STB/DVR 162A and STB/DVR 162B may comprise a computing system or server, such as computing system 400 depicted in FIG. 4, which dynamically scales the color temperature and luminance of a display output according to a user preference, as described herein. One or both of the STB/DVR 162A and STB/DVR 162B is further configured to decode data streams and to forward decoded data to a paired TV 163A or 163B for display.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
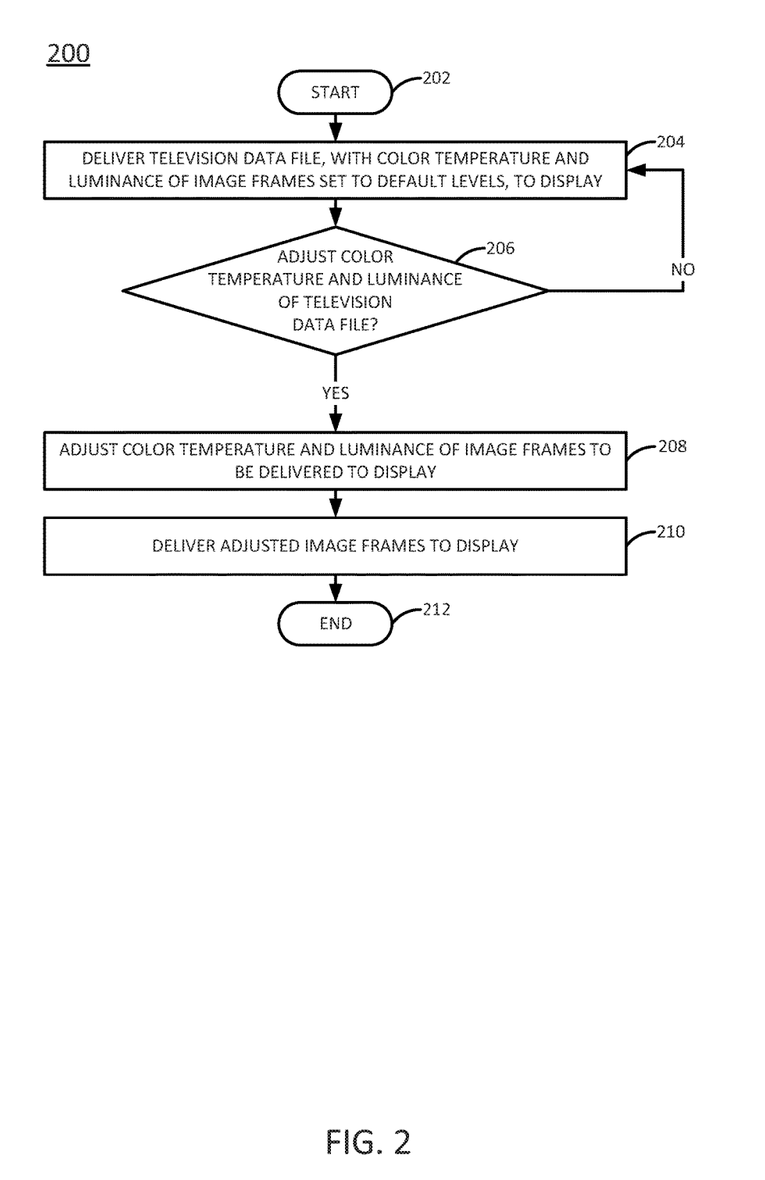
FIG. 2 illustrates a flowchart of a first example method for dynamically scaling the color temperature and luminance of a display output in accordance with the present disclosure.

To further aid in understanding the present disclosure, FIG. 2 illustrates a flowchart of a first example method 200 for dynamically scaling the color temperature and luminance of a display output in accordance with the present disclosure. In one example, the method 200 may be performed by an STB that also functions as a media server, such as one of the STB/DVRs 162A or 162B illustrated in FIG. 1. However, in other examples, the method 200 may be performed by another device. As such, any references in the discussion of the method 200 to an STB or STB/DVR are not intended to limit the means by which the method 200 may be performed.

The method 200 begins in step 202. In step 204, the STB delivers a decoded video output file (e.g., a television data file, which is either streaming live to the STB from content servers 113 or is stored locally on the STB) to a display, such as a television or a home computer. In one example, the video output file comprises a plurality of image frames arranged in a defined sequence. In step 202, the color temperature and luminance of the image frames being delivered to the display are set to default levels, which may be defined by the creator of the video output file.

In step 206, the STB determines whether to adjust the color temperature and luminance levels of the display output, i.e., to levels other than the default levels. In one example, a user preference dictates when it is time to adjust the color temperature and luminance levels to non-default levels. For instance, the user may program the STB (or a remote scaling server) to scale the color temperature and luminance levels of a display output to warmer levels (i.e., characterized by lower-than-default exposure to blue light) when he/she is trying to rest. In such an example, the STB may begin scaling the color temperature and luminance to warmer levels starting at some user predefined time (e.g., x hours prior to a time at which the user indicates he/she goes to sleep). The STB may also query an external source for the time at which sunset is expected to occur at the user's location (e.g., latitude and longitude), and began scaling at or near that time. Alternatively, the user may program the STB (or a remote scaling server) to scale the color temperature and luminance levels of a display output to cooler levels (i.e., characterized by higher-than-default exposure to blue light) when he/she is trying to stay awake or improve his/her concentration (e.g., while working or studying), or for therapeutic purposes (e.g., to mitigate the effects of high melatonin levels, seasonal affective disorders, jet lag, or the like). In this case, the STB may also begin scaling the color temperature at some user predefined time or at a time at which sunrise is expected to occur at the user's location.

In one example, the user may be presented with a range of shifts in color temperature and luminance, from which the user can select the range that best suits his/her needs at a particular time. In another example, the user may be presented with predefined color temperature and luminance settings that are recommended for certain activities (e.g., rest/sleeping, working, etc.).

If the STB concludes in step 206 that the color temperature and luminance of the display output should not be adjusted, then the method 200 returns to step 204, and the STB continues to deliver the decoded video output file to the display, in accordance with the default color temperature and luminance levels.

If, however, the STB concludes in step 206 that the color temperature and luminance of the display output should be adjusted, then the method 200 proceeds to step 208. In step 208, the STB adjusts the color temperature and luminance of the image frames to be delivered to the display, in accordance with the user preference. In one example, the adjustment of the color temperature and luminance is accomplished by shifting the reference white point of each image frame toward either warmer or cooler wavelengths. For instance, the color temperature may be remapped using a chromatic adaptation process performed in the XYZ color space (i.e., in which the tristimulus values of the XYZ space specify a color's lightness (light or dark), hue (red, orange, yellow, green, blue, or purple), and saturation (pink-red, pastel-fluorescent, or baby blue-deep blue). In one example, the color temperature and luminance may be adjusted gradually, so that the transition from the default or current settings to the target settings is made over time. In another example, the color temperature and luminance are adjusted from the default or target settings instantaneously to the target settings (e.g., without a gradual transition). One method for shifting the reference white points of the image frames is described in greater detail in connection FIG. 3.

In step 210, the STB delivers the image frames having the adjusted color temperature and luminance levels to the display for display to the user.

The method 200 ends in step 212.

Figure 3:
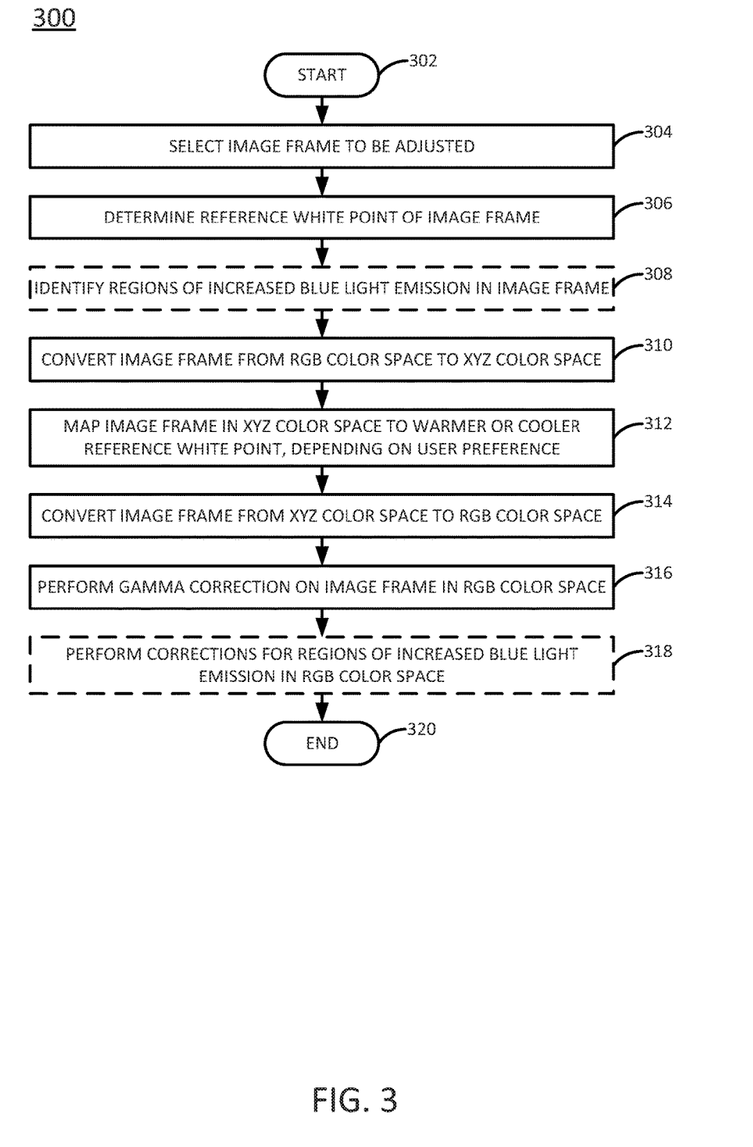
FIG. 3 illustrates a flowchart of a second example method for dynamically scaling the color temperature and luminance of a display output in accordance with the present disclosure.

FIG. 3 illustrates a flowchart of a second example method 300 for dynamically scaling the color temperature and luminance of a display output in accordance with the present disclosure. In one example, the method 300 may be performed by an STB that also functions as a media server, such as one of the STB/DVRs 162A or 162B illustrated in FIG. 1. However, in other examples, the method 300 may be performed by another device. As such, any references in the discussion of the method 300 to an STB or STB/DVR are not intended to limit the means by which the method 300 may be performed.

The method 300 begins in step 302. In step 304, the STB selects the image frame to be adjusted. In one example, image frames are selected in sequence (e.g., in order of time stamp) starting from the time at which the adjustment begins.

In step 306, the STB determines the reference white point (i.e., the set of chromaticity coordinates that defines the color "white" in the image frame) of the selected image frame. In one example, the STB may scan the image frame to determine its reference white point. In another example, the STB may obtain the reference white point from another source, such as by looking the reference white point up in a lookup table.

In optional step 308 (illustrated in phantom), the STB identifies regions of increased blue light emission in the image frame, such as shadows and sky. In one example, a Kalman filtering technique is used to identify and learn the frame-to-frame boundaries between these regions. In general, these regions do not change drastically from frame-to-frame, except when changing scenes, during intense action sequences, or when the camera angle is panning or shifting dramatically. Thus, filtering will reduce processor overhead during the final stages of the method 300, where adjustments are made to optimize viewing within the new color space. In one example, step 308 also includes identifying the types of the light sources of the identified regions (e.g., spotlight, ambient light, etc.). Knowing or estimating the type of light source will assist in rapid convergence and prediction of shadowed regions. Step 308 may be selectively enabled by the user, for instance when watching a movie.

In step 310, the STB converts the image frame from the RGB (red, green, blue) color space to the XYZ (tristimulus) color space. The mechanics of this conversion may vary depending on the reference white point, which is set based on the lighting used during the filming of the image frame (and is typically constant for a given scene). For instance, outdoor daylight scenes are likely to have the highest reference white point, while nighttime and dimly illuminated indoor scenes will likely have the lowest reference white points. In one example, a reference white point for a scene is identified in a lookup table that specifies known, pre-calculated reference white points at various intervals throughout the video output file. In another example, the reference white point may be dynamically estimated by scanning the image frame, determining the saturation level of the colors and overall brightness outside of any shadowed regions, and then estimating the color temperature of the reference white point based on these observed criteria. In either case, the reference white point may be estimated at the beginning of the adjustment process and subsequently each time the overall blue luminance level changes by more than a predefined threshold (e.g., fifteen percent, as measured at an interval matching the frame rate of the television broadcast).

Using the reference white point, the image frame can then be converted from the RGB color space to the XYZ color space by pre-multiplying the RGB matrix by a conversion matrix M, such that:

$$\begin{bmatrix} X \\ Y \\ Z \end{bmatrix} = [M] \begin{bmatrix} R \\ G \\ B \end{bmatrix} \quad \text{(EQN. 1)}$$

where the conversion matrix M is defined as:

$$[M] = \begin{bmatrix} S_r X_r & S_g X_g & S_b X_b \\ S_r Y_r & S_g Y_g & S_b Y_b \\ S_r Z_r & S_g Z_g & S_b Z_b \end{bmatrix} \quad \text{(EQN. 2)}$$

And where $X_r=x_r/y_r$; $Y_r=1$; $Z_r=(1-x_r-y_r)/y_r$; $X_g=x_g/y_g$; $Y_g=1$; $Z_g=(1-x_g-y_g)/y_g$; $X_b=x_b/y_b$; $Y_b=1$; and $Z_b=(1-x_b-y_b)/y_b$. Here, the pairs $(x_r, y_r)$, $(x_g, y_g)$, and $(x_b, y_b)$ are referred to as the "chromaticity coordinates" of the image frame's RGB color space.

Since a display comprising individual red, green, and blue lighting elements can be visualized as an array of colored lamps (each with its own dimming switch), the color gamut of the display is the set of all colors possible with the particular shade of red, green, and blue used on the display. The three chromaticity coordinates (for red, green, and blue) thus define the vertices of a triangular region of available colors within a chromaticity diagram of all possible colors that can be displayed. The reference white point is located near the center of the chromaticity diagram. $S_r$, $S_g$, and $S_b$ may be defined in terms of the reference white points $X_W$, $Y_W$, and $Z_W$ as:

$$\begin{bmatrix} S_r \\ S_g \\ S_b \end{bmatrix} = \begin{bmatrix} X_r & X_g & X_b \\ Y_r & Y_g & Y_b \\ Z_r & Z_g & Z_b \end{bmatrix}^{-1} \begin{bmatrix} X_W \\ Y_W \\ Z_W \end{bmatrix} \quad \text{(EQN. 3)}$$

In step 312, the STB maps the image frame (as converted to the XYZ color space) to a warmer (e.g., less blue and green light, less overall perceived brightness) or cooler (e.g., more blue and green light, more overall perceived brightness) reference white point, depending on the user preference. In one example, each source color $(X_S, Y_S, Z_S)$ in the image frame is remapped to a target color $(X_T, Y_T, Z_T)$ starting in the XYZ color space in terms of the source and target reference whites. In one example, this remapping is performed according to the following:

$$\begin{bmatrix} X_T \\ Y_T \\ Z_T \end{bmatrix} = [M] \begin{bmatrix} X_S \\ Y_S \\ Z_S \end{bmatrix} \quad \text{(EQN. 4)}$$

where the conversion matrix M is determined by an additional transform from the XYZ color space into the cone response domain ργΦ. In the cone response domain, the source reference white point $(X_{WS}, Y_{WS}, Z_{WS})$ and the target reference white point $(X_{WT}, Y_{WT}, Z_{WT})$ are used to linearly scale the color's vector components. The target reference white point is chosen based upon the source reference white point and the degree of blue level addition or reduction indicated by the user preferences. After scaling, the target color is transformed back to the XYZ color space, and then to the RGB color space as discussed in further detail below.

In one example, the mapping to and from the cone response domain is performed using the conversion matrix MA and its inverse, e.g.:

$$[M_A] = \begin{bmatrix} 0.8951000 & 0.2664000 & -0.1614000 \\ -0.7502000 & 1.7135000 & 0.0367000 \\ 0.0389000 & -0.0685000 & 1.0296000 \end{bmatrix} \quad \text{(EQN. 5)}$$

$$[M_A]^{-1} = \begin{bmatrix} 0.9869929 & -0.1470543 & 0.1599627 \\ 0.4323053 & 0.5183603 & 0.0492912 \\ -0.0085287 & 0.0400428 & 0.9684867 \end{bmatrix}$$

Each source and target reference white point may be transformed into the cone response domain according to the following relations:

$$\begin{bmatrix} \rho_S \\ \gamma_S \\ \beta_S \end{bmatrix} = [M_A] \begin{bmatrix} X_{WS} \\ Y_{WS} \\ Z_{WS} \end{bmatrix} \quad \text{(EQN. 6)}$$

$$\begin{bmatrix} \rho_T \\ \gamma_T \\ \beta_T \end{bmatrix} = [M_A] \begin{bmatrix} X_{WT} \\ Y_{WT} \\ Z_{WT} \end{bmatrix}$$

The conversion matrix M can then be defined in terms of the ratios in the cone response domain reference white points as:

$$[M] = [M_A]^{-1} \begin{bmatrix} \rho_T/\rho_S & 0 & 0 \\ 0 & \gamma_T/\gamma_S & 0 \\ 0 & 0 & \beta_T/\beta_S \end{bmatrix} [M_A] \quad \text{(EQN. 7)}$$

In step 314, the STB converts the image frame from the XYZ color space back to the RGB color space. In one example, the conversion from the XYZ color space to the RGB color space is performed using the target reference white point value.

In step 316, the STB performs a gamma correction on the image frame to account for the grayscale perception distortion in the color scheme according to the adjusted color temperature. In one example, the correction ensures that the range of gray displayed under the adjusted color temperature matches the range of gray previously perceived by the rods in a normal human eye. In one example, the endpoints are adjusted to match the perceived transitions between gray and black on the lower end, and gray and white on the upper end. This ensures proper representation of the light and dark areas in the adjusted image frame. Then, the source grayscale can be mapped to this new region in a nonlinear manner as $V_{out}=AV_{in}^y$, where A may be 1, y is an empirically derived constant (e.g., for an NTSC television recording, y=2.2), and $V_{in}$ and $V_{out}$ are corrected and uncorrected grayscales, respectively (e.g., in the range of zero to one).

In optional step 318 (illustrated in phantom), the STB performs additional corrections for the regions of increased blue light emission that were identified in step 308. For instance, if sky is present in the image frame, it is adjusted to best match the hue of the sky in the original (unadjusted) image frame. More blue and green light may be selectively added back into the image frame or selectively removed from the image frame (e.g., depending on the user preferences). Similarly, if a shadowed region is present in the image frame, blue and green light may be selectively added or subtracted until the hue of the shadowed region resembles the hue of the shadowed region in the original image frame. Thus, step 318 helps to counteract the tendency of the sky and shadows (and potentially other regions) to look too orange in the uncorrected adjusted image frame (if shifting the reference white point toward warmer color temperatures) or too blue (if shifting the reference white point toward cooler color temperatures), while still reducing or increasing the overall color temperature of the image frame as dictated by the user preferences.

The method 300 ends in step 320.

Although examples of the methods 200 and 300 are described as being performed by an STB (e.g., a device at the customer premises which acts as an intermediary between content servers in the core network and the display at the customer premises), the methods could also be performed "in the cloud," e.g., by scaling server 115. This would allow a display that is not in direct communication with an STB, such as the display on a mobile device (e.g., a smart phone, a tablet computer, or laptop computer), to receive content with the color temperature and luminance adjusted per the user's preferences.

In further examples, the STB or scaling server may be programmed to send signals to connected home devices (e.g., "smart" devices such as thermostats, home appliances, and other devices that can be programmed to monitor the related home systems and to react to certain detected conditions by adjusting the settings of the related home systems) to enhance the effects of the adjustments to the display output. For instance, if the display output is being adjusted to reduce exposure to blue light (e.g., when the user is trying to rest), the STB or scaling server may send a signal to a "smart" dimming switch to dim the ambient lighting in parts of the user's home. In this case, the home lighting system could be catalogued according to its color temperature(s), and systems that cannot be dimmed could simply be switched off according to a user-defined priority level (e.g., systems with the highest priority, such as systems in rooms where brighter lighting is desirable, could be switched off last). Alternatively, systems with higher color temperature (i.e., containing larger amounts of blue light), or systems having spectra that include higher blue light levels (e.g., light-emitting diode or fluorescent-based systems) could be switched off first. The lighting type, dimming availability, and location could be available from the user's home control system, or could be manually entered by the user via a control application that provides the information to the scaling server (assuming that each light switch is addressable, e.g., via Internet Protocol on the home Internet).

In further examples still, where the user wishes to increase his exposure to blue light (e.g., to improve alertness or for therapeutic purposes), the display output may not be a television program or a movie at all. Instead, the display output could simply be a blank screen having a user-configurable constant level of brightness of blue, green, or white light. In this case, the display could be used to simulate the color temperature and spectrum of natural daylight, or a variation of natural daylight. Thus, the display could be used, for example, to replace therapeutic banks of fluorescent lights or similar systems.

Although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or the method 300 may be implemented as the system 400. For instance, a server or a set-top box or other controller could be implemented as illustrated in FIG. 4.

As depicted in FIG. 4, the system 400 comprises a hardware processor element 402, a memory 404, a module 405 for dynamically scaling the color temperature and luminance of a display output, and various input/output (I/O) devices 406.

The hardware processor 402 may comprise, for example, a microprocessor, a central processing unit (CPU), or the like. The memory 404 may comprise, for example, random-access memory (RAM), read-only memory (ROM), a disk drive, an optical drive, a magnetic drive, and/or a Universal Serial Bus (USB) drive. The module 405 for dynamically scaling the color temperature and luminance of a display output may include circuitry and/or logic for performing special purpose functions relating to the operation of a set-top box or other media controller. The input/output devices 406 may include, for example, a camera, a video camera, storage devices (including, but not limited to, a tape drive, a floppy drive, a hard disk drive, a compact disc drive, a flash drive, or a solid-state drive), a receiver, a transmitter, a speaker, a display, a speech synthesizer, an output port, and a user input device (such as a keyboard, a keypad, a mouse, and the like), or a sensor.

Although only one processor element is shown, it should be noted that the general-purpose computer may employ a plurality of processor elements. Furthermore, although only one general-purpose computer is shown in the Figure, if the method(s) as discussed above is (are) implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for dynamically scaling the color temperature and luminance of a display output (e.g., a software program comprising computer-executable instructions) can be loaded into memory 404 and executed by hardware processor element 402 to implement the steps, functions or operations as discussed above in connection with the example method 200 or the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for dynamically scaling the color temperature and luminance of a display output (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method, comprising:
    delivering, by a processor, a first subset of a plurality of image frames as a video output signal to a display device for display to a user;
    detecting, by the processor, a user predefined time of day at which to adjust an amount of blue light emitted by the display device, in accordance with a user preference indicating the user predefined time of day that defines a particular amount of time prior to a time of sleep of the user;
    determining, by the processor, a time at which sunset is expected to occur at a location of the user;
    adjusting, by the processor in response to the detecting and the determining, a color temperature of a second subset of the plurality of image frames that have yet to be delivered to the display device from a default color temperature to an adjusted color temperature that scales the amount of blue light emitted by the display device, wherein the adjusting comprises:
        identifying a region of increased blue light emission in at least one frame of the second subset of the plurality of image frames;
        mapping each image frame of the second subset of the plurality of image frames from a red, green, blue color space to a tristimulus color space;
        performing a chromatic adaptation on each image frame of the second subset of the plurality of image frames in the tristimulus color space;
        subsequent to the performing, mapping each image frame of the second subset of the plurality of image frames from the tristimulus color space back to the red, green, blue color space; and
        subsequent to the mapping from the tristimulus color space back to the red, green, blue color space, adjusting a hue of the region of increased blue light emission to match a hue of the region of increased blue light emission prior to the chromatic adaptation; and
    delivering, by the processor, the second subset of the plurality of image frames as the video output signal to the display device, subsequent to the adjusting, to control the amount of blue light exposed to the user.

2. The method of claim 1, where the adjusting further comprises:
    adjusting a luminance of the second subset of the plurality of image frames from a default luminance to an adjusted luminance that scales the amount of blue light emitted by the display device.

3. The method of claim 1, wherein the adjusted color temperature contains more blue light than the default color temperature.

4. The method of claim 1, wherein the adjusted color temperature contains less blue light than the default color temperature.

5. The method of claim 1, wherein the adjusting further comprises:
    shifting a reference white point of each image frame in the second subset of the plurality of image frames to produce the adjusted color temperature.

6. The method of claim 5, wherein the reference white point is estimated each time an overall blue luminance level changes by more than a predefined threshold over an interval matching a frame rate of the video output signal.

7. The method of claim 1, wherein the adjusting is performed so that a transition from the default color temperature to the adjusted color temperature is gradual.

8. The method of claim 1, wherein the adjusting is performed so that a transition from the default color temperature to the adjusted color temperature is instantaneous.

9. The method of claim 1, where the detecting comprises:
    identifying the user predefined time of day at which the user preference is scheduled to be applied.

10. The method of claim 1, wherein the region of increased blue light emission depicts sky.

11. The method of claim 1, wherein the region of increased blue light emission depicts a shadow.

12. The method of claim 1, wherein the identifying the region of increased blue light emission is performed using a Kalman filtering technique.

13. The method of claim 1, wherein the adjusting the hue comprises selectively adding blue and green light to the region of increased blue light emission.

14. The method of claim 1, wherein the adjusting the hue comprises selectively subtracting blue and green light from the region of increased blue light emission.

15. The method of claim 1, wherein the method is performed by a set-top box that is communicatively coupled to a source of the video output signal and to the display device.

16. The method of claim 1, further comprising:
    in response to the detecting, sending a signal to a connected home device to adjust a setting of a home system to adjust an amount of blue light emitted by the home system.

17. A device, comprising:
    a processor; and
    a computer-readable medium storing instructions which, when executed by the processor, cause the processor to perform operations, the operations comprising:
        delivering a first subset of a plurality of image frames as a video output signal to a display device for display to a user;
        detecting a user predefined time of day at which to adjust an amount of blue light emitted by the display device, in accordance with a user preference indicating the user predefined time of day that defines a particular amount of time prior to a time of sleep of the user;

determining a time at which sunset is expected to occur at a location of the user;

adjusting, in response to the detecting and the determining, a color temperature of a second subset of the plurality of image frames that have yet to be delivered to the display device from a default color temperature to an adjusted color temperature that scales the amount of blue light emitted by the display device, wherein the adjusting comprises:

identifying a region of increased blue light emission in at least one frame of the second subset of the plurality of image frames;

mapping each image frame of the second subset of the plurality of image frames from a red, green, blue color space to a tristimulus color space;

performing a chromatic adaptation on each image frame of the second subset of the plurality of image frames in the tristimulus color space;

subsequent to the performing, mapping each image frame of the second subset of the plurality of image frames from the tristimulus color space back to the red, green, blue color space; and subsequent to the mapping from the tristimulus color space back to the red, green, blue color space, adjusting a hue of the region of increased blue light emission to match a hue of the region of increased blue light emission prior to the chromatic adaptation; and delivering the second subset of the plurality of image frames as the video output signal to the display device, subsequent to the adjusting, to control the amount of blue light exposed to the user.

18. The device of claim 17, where the adjusting further comprises:

adjusting a luminance of the second subset of the plurality of image frames from a default luminance to an adjusted luminance that scales the amount of blue light emitted by the display device.

19. The device of claim 17, wherein the adjusting comprises:

shifting a reference white point of each image frame in the second subset of the plurality of image frames to produce the adjusted color temperature.

20. An apparatus, comprising:

a processor for detecting a user predefined time of day at which to adjust an amount of blue light emitted by a display device, in accordance with a user preference indicating the user predefined time of day that defines a particular amount of time prior to a sleep time of a user, for determining a time at which sunset is expected to occur at a location of the user, and for adjusting a color temperature of a plurality of image frames that has yet to be delivered to the display device as a video output signal from a default color temperature to an adjusted color temperature that scales the amount of blue light emitted by the display device, in response to the detecting the user predefined time of day and the determining the time, to control the amount of blue light exposed to the user, wherein the adjusting comprises:

identifying a region of increased blue light emission in at least one frame of the plurality of image frames;

mapping each image frame of the plurality of image frames from a red, green, blue color space to a tristimulus color space;

performing a chromatic adaptation on each image frame of the plurality of image frames in the tristimulus color space;

subsequent to the performing, mapping each image frame of the plurality of image frames from the tristimulus color space back to the red, green, blue color space; and subsequent to the mapping from the tristimulus color space back to the red, green, blue color space, adjusting a hue of the region of increased blue light emission to match a hue of the region of increased blue liqht emission prior to the chromatic adaptation; and an output device for delivering the video output signal to the display device for display to the user, subsequent to the adjusting.

* * * * *